Figure 1:
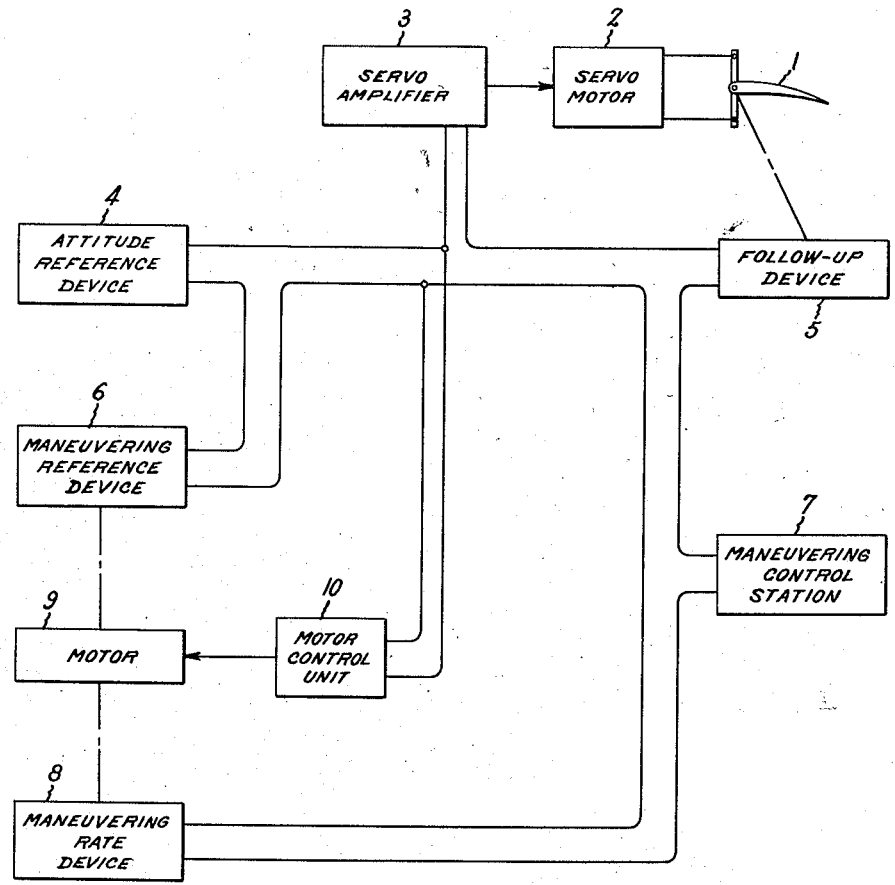

June 25, 1957 C. M. YOUNG 2,797,379
MANEUVERING AUTOMATIC PILOT
Filed April 4, 1950 3 Sheets-Sheet 1

Inventor:
Charles M. Young,
by Claude H. Mott
His Attorney.

Inventor:
Charles M. Young,
by (signature)
His Attorney.

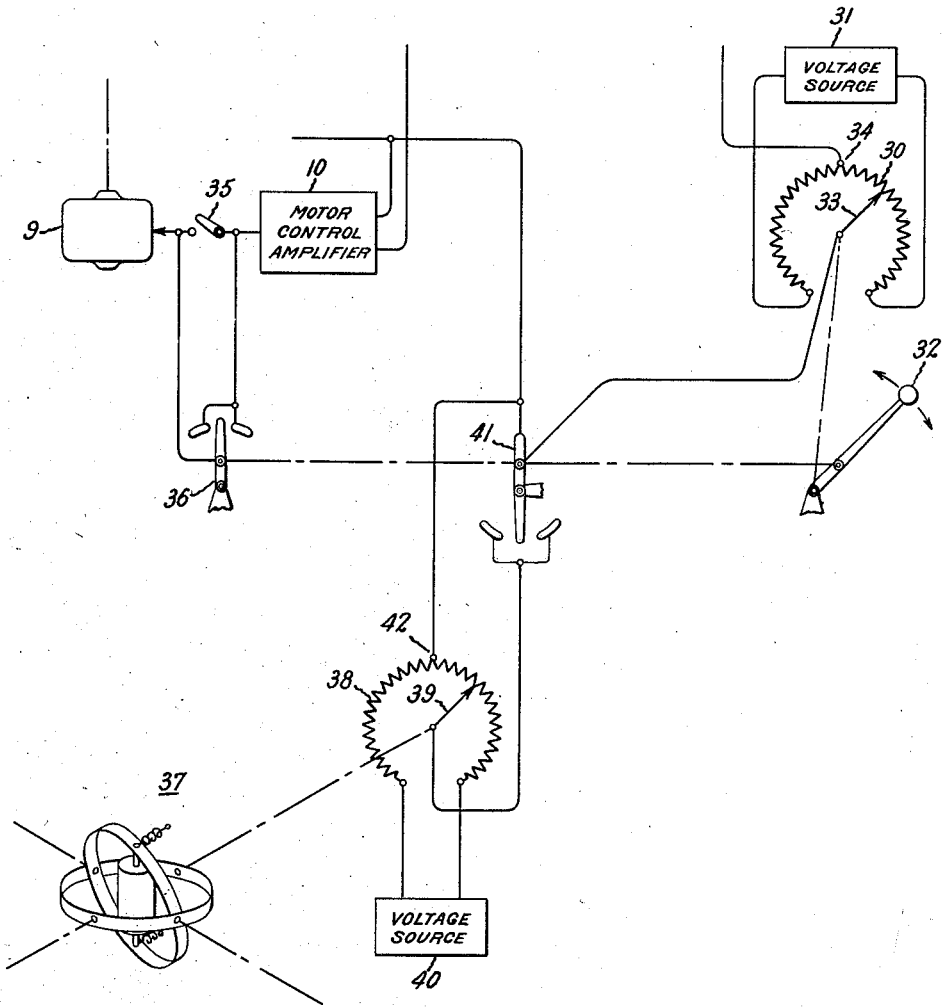

United States Patent Office 2,797,379
Patented June 25, 1957

2,797,379

MANEUVERING AUTOMATIC PILOT

Charles M. Young, Schenectady, N. Y., assignor to General Electric Company, a corporation of New York Application April 4, 1950, Serial No. 153,788

12 Claims. (Cl. 318—489)

This invention relates to automatic control systems, and more particularly to automatic pilot control systems having means for manually maneuvering the craft controlled by the automatic pilot while the automatic pilot is engaged.

Conventional automatic pilots used on aircraft, for example, function to stabilize the craft about three control axes, namely, the vertical or yaw axis, the longitudinal or roll axis, and the lateral or pitch axis. As is well known, such stabilized control of flight is accomplished by actuating the rudder, ailerons and elevators of the aircraft in response to motions of the craft about the axes with which these control surfaces are associated, the control surfaces being actuated in directions to correct for undesired motions and to maintain predetermined flight conditions. Movements of control surfaces during automatic pilot operation are produced by servomotor equipment which may respond to actuating signals derived from reference apparatus such as gyroscopic instruments, pendulums, compasses and altitude-responsive devices.

Maneuvering by means of an autopilot control system is advantageous in that the sensitive autopilot equipment need not be disengaged from autopilot operation to permit such maneuvering and then be re-engaged for stabilized operation. Many arrangements have been proposed whereby manipulations of a miniature control stick or other control member produces control signals which are introduced into an autopilot system to cause actuation of the aircraft control surfaces by the servomotors and, hence, the accomplishment of maneuvers corresponding to motions of the control stick.

One previous type of maneuvering autopilot having this feature is known as the position type. In this type of autopilot, the attitude of the aircraft in pitch and roll is set by the attitude of the miniature control stick with respect to the craft. This type of autopilot has two main disadvantages. First, the motion of the stick must be smooth and gradual to avoid violent motion of the craft because the stick forms part of a servo system which operates to eliminate any introduced errors in the shortest time. Secondly, this type of maneuvering autopilot is complicated by trim effects. It is generally desirable to have neutral stick position represent straight level flight, but in order to meet this requirement in the position type of maneuvering autopilot, it is necessary to have separate attitude controls to compensate for changes in trim, loading and power. Furthermore, if automatic synchronization is used in an attitude other than level flight, the stick position does not represent plane attitude unless the automatic synchronizing mechanism operates so as to move the stick, which is an undesirable complication.

A second previous type of maneuvering autopilot is the jog or "beep" type in which the attitude of the plane in pitch and roll is changed at a constant rate, the amount of change being proportional to the time the control stick is displaced. This type of autopilot does not have trim effects, but is complicated by the fact that only one speed of adjustment is available. This same speed must be used for both attitude trim adjustments and large angle maneuvering.

It is an object of this invention to provide a new and improved maneuvering autopilot which may be termed a "variable rate" type. That is, one in which the craft maneuvers at a variable rate which is dependent upon the amount of displacement of the miniature control stick.

A further object of the invention is to provide an autopilot which automatically synchronizes without undue disturbance regardless of the attitude of the craft when the autopilot is engaged.

A still further object of the invention is the provision of a maneuvering autopilot which permits rapid maneuvering of the craft within limits of safety without disengaging the autopilot.

In carrying out my invention in one form, I provide for the operation of a control surface of a craft by a conventional servo system comprising a servo amplifier and a servomotor. Stabilized autopilot operation is provided by an attitude reference device which supplies actuating signals to the servo system when an undesired motion of the craft occurs, and a follow-up device operated by the control surface which is connected in circuit with the attitude reference device to limit the operation of the latter. Automatic synchronizing of the autopilot is provided by a maneuvering reference device in circuit with the attitude reference device which follows the latter until halted by the synchronizing operation, after which it serves as a secondary reference. Maneuvering after synchronizing the autopilot is accomplished by a control signal device actuated by a miniature control stick, and a maneuvering rate responsive device connected in opposition thereto, both being also connected in the main servo system.

Figure 2:
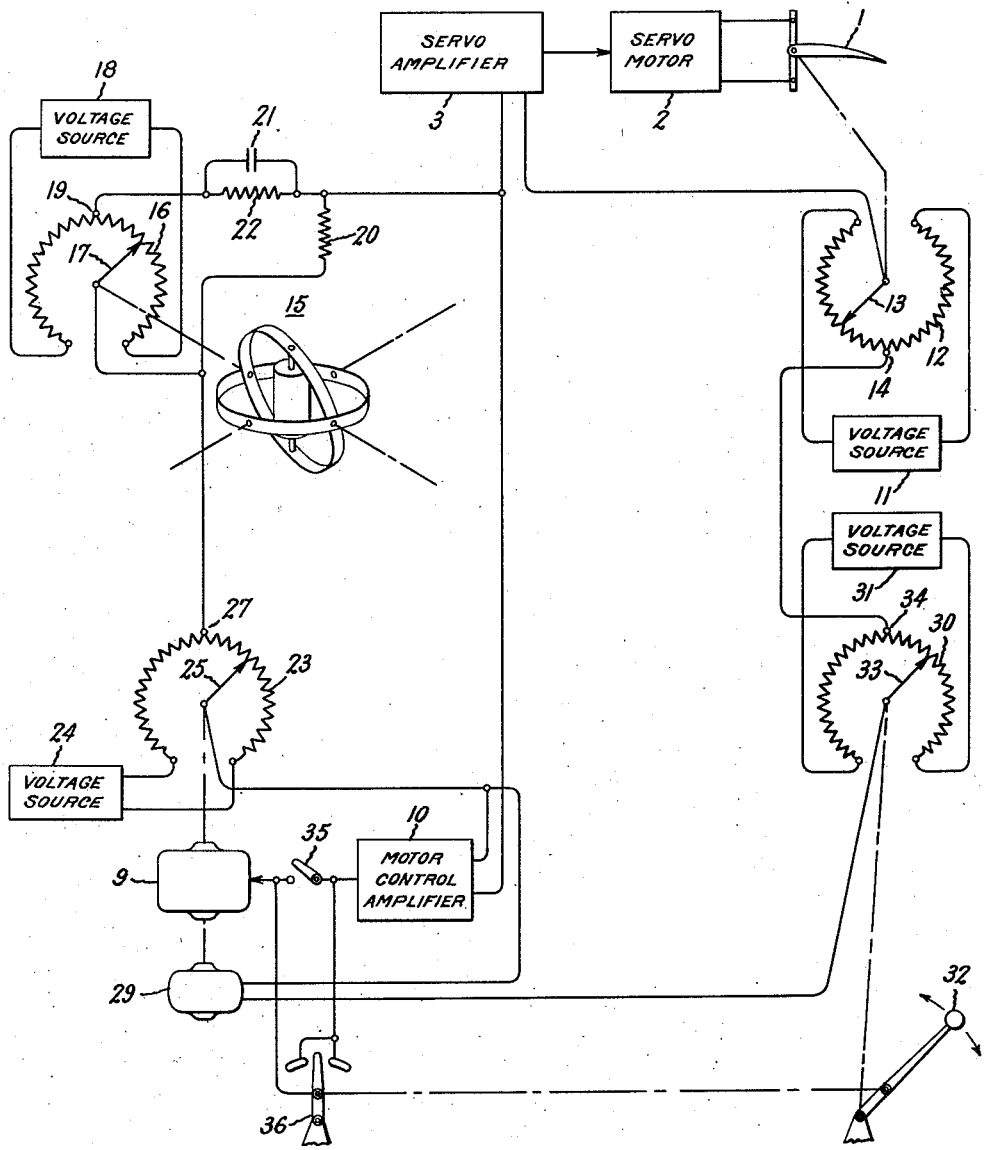

For a clearer and more complete understanding of my invention, reference should be had to the accompanying drawing in which Fig. 1 represents in block form a single-channel maneuvering autopilot system in accordance with this invention; Fig. 2 depicts, partially in block and partially in schematic form, a more detailed embodiment of one channel of the maneuvering autopilot of the invention whereby the foregoing objects are satisfied; while Fig. 3 is a partial block and schematic diagram illustrating a modified embodiment of the invention.

Automatic piloting systems are conventionally comprised of several electrical, mechanical, or fluid-pressure channels, by means of which it is possible to control separate functions by equipment in these substantially independent channels. It is possible, for example, to control such functions as motions of the craft with respect to the yaw axis, roll axis, pitch axis, a radio guide path, or altitude, and the apparatus for producing corrective movements of the craft in response to signals indicating erroneous movements thereof may often be represented as a single channel. For purposes of simplicity and clarity, the diagrams of the present invention are not those of a complete multiple-function autopilot, but instead show only a single maneuvering autopilot channel, it being apparent to those skilled in the art that the same principles may be applied with equal facility to other channels.

In carrying out my invention in one form, I provide for the operation of a control surface of an aircraft by a conventional servo system comprising a servo amplifier and a servomotor. Stabilized autopilot operation is provided by an attitude reference device which supplies actuating signals to the servo system when an undesired motion of the craft occurs, and a follow-up device operated by the control surface which is connected in circuit with the attitude reference device to limit the operation of the latter. Automatic synchronizing operation is provided by a maneuvering reference signal device which is also connected in the servo amplifier signal circuit with the attitude reference device. During conventional manual operation of the aircraft, the maneuvering reference signal device is driven by a motor which is operated in accordance with the difference between the signal from the attitude reference device and the signal from the maneuvering reference signal device itself in a degenerative manner such that the maneuvering reference signal device tends to reduce this difference to zero. Thus, the maneuvering reference signal device is caused to follow the attitude reference device, thereby acting as a feedback device energizing the servo system in opposition to the atitude reference device. When the autopilot is engaged, the operating motor of the maneuvering reference device is deenergized. This stops the operation of the maneuvering reference device, and thereafter during autopilot operation it serves as a secondary reference. Also connected in circuit with the other components of the servo amplifier signal system are a maneuvering control station, which is operated by a miniature control stick or other suitable operating device, and a maneuvering rate signal device, which is driven by the motor which drives the maneuvering reference device. The maneuvering rate device is connected degeneratively with respect to the signal introduced by the maneuvering control station, in effect being a feedback device which energizes the servo system in opposition to the maneuvering control station. A movement of the control station causes a movement of the control surface, which results in a motion of the aircraft and a difference between the signal from the attitude reference device and that from the maneuvering reference signal device which causes the motor to accelerate the maneuvering reference signal device to a rate which will maintain this difference essentially zero. Thus, the signal voltage output of the maneuvering rate device, which is proportional to the rate of change of the maneuvering reference device, is also proportional to the rate of change of plane attitude. Since the difference in signals between the attitude reference device and the maneuvering reference device is maintained essentially zero, the control signal for the main autopilot system is the difference between the maneuvering rate signal and the control station signal. Therefore, the control surface will move and the plane will continue to accelerate until its rate, as indicated by the maneuvering rate signal device, is equal to that set in by the control station. Thus, the aircraft maneuvers at a rate which is dependent upon the extent of the displacement of the control station.

It will be apparent to those skilled in the art that strict proportionality will not be obtained in the present autopilot system unless means for eliminating follow-up trim effects are provided, such as those disclosed in my copending application Serial No. 39,347, filed July 17, 1948, now Patent No. 2,664,530, issued December 29, 1953, which is assigned to the assignee of the present invention. The discussion of the details of elimination of these effects is omitted from the present description in order to simplify it. Suffice to say here that these effects can be eliminated, if desired, by known means.

Referring to Fig. 1 of the drawing, the control system of my invention is represented with respect to an aircraft pitch axis and the control surface 1, shown accordingly as an elevator, may be actuated by a conventional servomotor 2 responsive to signals from a servo amplifier 3. Control signals are delivered to the signal circuit of the servo amplifier from five sources: an attitude reference device 4, a follow-up device 5, a maneuvering reference signal source 6, a maneuvering control station 7, and a maneuvering rate signal device 8. The attitude reference device 4 may be a gyroscopic instrument with associated equipment for producing an output signal for actuating the servo system which is variable in sense and magnitude in accordance with the sense and extent of the craft movements about the pitch axis. Follow-up device 5 provides repeat-back signals for the servo amplifier responsive to movement of the control surface 1 and thereby reduces the tendency of the craft to hunt or oscillate about the desired path of flight. The system also includes a motor 9 which drives maneuvering reference signal source 6 and maneuvering rate device 8, and a controller 10 for motor 9.

It is known to introduce into the input to the servo amplifier a maneuvering control signal which actuates the servo system and control surface to accomplish maneuvering of the craft by upsetting the stabilized relation existing in the servo amplifier control circuit during stabilized autopilot operation. Such a maneuvering control signal may, for example, be one variable in sense and magnitude with changes in the direction and extent of motion of a manually-movable maneuvering control member, such as a miniature control stick or knob, from a neutral position. The disadvantages hereinbefore mentioned in connection with this type of maneuvering arrangement in an autopilot system are not incurred by the system of the present invention, however. Maneuvering control station 7 in the present invention produces a control signal output having the above characteristics, but this output is modified by the actions of maneuvering reference signal source 6 and maneuvering rate device 8. The output of the maneuvering control station 7 is applied to the servo amplifier and causes a displacement of control surface 1 which, in turn, causes a change in the attitude of the craft. This causes the attitude reference device 4 to produce a signal voltage which operates the motor controller 10 and causes motor 9 to drive signal source 6 so as to cause this signal to be equal and opposite to that of the attitude reference device 4. Motor 9 also drives maneuvering rate device 8, however. And, since device 8 is connected degeneratively with respect to control station 7, the speed of motor 9 increases until the signal voltage output of device 8 equals the control signal voltage introduced into the system by control station 7. During this time, the aircraft is undergoing an accelerating change of attitude. Thereafter, motor 9 operates and drives signal source 6 at a constant speed as long as control station 7 remains in the same displaced position and the aircraft maneuvers at a constant rate in accordance with the signal from the control station until the control station is again moved.

In other words, during autopilot maneuvering operation the motor 9, motor control unit 10 and maneuvering reference device 6 are used as a means of obtaining a shaft position proportional to airplane attitude and a signal from the maneuvering reference device which cancels out the signal from the attitude reference device as far as the main control loop is concerned. The maneuvering reference signal device 6 follows the aircraft and, therefore, the signal from maneuvering rate device 8, which is on the same shaft as device 6, is proportional to the rate of change of attitude of the aircraft. By comparing the signal from device 8 with that from the control station 7, an error signal is obtained in the main control system which causes the aircraft, through the control surface system, to correct its rate of change of attitude until this error signal is reduced to zero. This occurs when the aircraft is maneuvering at a rate proportional to the position of the control station.

Maneuvering reference signal source 6 is illustrated with a mechanical connection to a movable element of motor 9 which similarly and simultaneously drives the maneuvering rate device 8. The motor control unit 10 delivers an output of actuating signals to motor 9 which operate the motor to produce mechanical movements having a direction and rate responsive to the sense and magnitude of the signals from unit 10. The input to motor control unit 10, which may take the form of a signal mixer or amplifier, is the difference of the signal outputs from attitude reference device 4, and maneuvering reference signal source 6.

In operation of the maneuvering autopilot, if the control surface 1 is to be deflected to maneuver the craft in a desired direction, the control station 7 is manually adjusted to produce an output signal of the appropriate sense and of suitable magnitude. Assuming that no signal from device 6 or device 8 exists prior to this adjustment, due to a stable on-course condition of flight, the control station signal is applied at full magnitude to servo amplifier 3. Servo amplifier 3 causes servo motor 2 to displace control surface 1 from its previous streamlined position. This causes the craft to maneuver, which results in a signal from attitude reference device 4. This, in turn, upsets the balance previously existing between the signals from device 4 and maneuvering reference signal source 6. Responsively to the sense and magnitude of the difference between these signals, the motor 9 begins to move in a direction to cause the signal output from device 6 to eliminate this difference and maintain a null of voltage between these signal sources. However, the motion of the motor 9 also actuates device 8 which may, for example, produce an output proportional to the rate of the motor mechanical output movement, having a polarity or phase dependent upon the direction of such movement, and this output is connected in opposition to the control station output in a manner such that the latter output is thereby reduced. Thus, the rate at which device 6 moves in following attitude reference 4 varies as a function of the instantaneous difference between the outputs of generator 8 and control station 7 until the speed of motor 9 becomes great enough that these two outputs are equal. Thereafter, motor 9 runs at a constant speed and the rate of movement of maneuvering reference signal device 6 remains constant as long as control station 7 remains unchanged. This means that the craft maneuvers at substantially a constant rate corresponding to this position as long as control station 7 remains unchanged.

Fig. 2 depicts a more detailed embodiment of the autopilot arrangement which will accomplish maneuvering with reference to the aircraft pitch axis. It will become apparent that maneuvering with respect to other axes may be similarly accomplished. Control surface 1, servo motor 2, and servo amplifier 3 have, for convenience, been designated with the same numerals employed in the system of Fig. 1. Follow-up or autopilot repeatback signals are produced by the combination of a voltage source 11 and a potentiometer 12 connected thereacross, a wiper arm 13 being coupled to the control surface 1 for rotation therewith and the output of follow-up signals being derived from between wiper arm 13 and a tap point 14 on the potentiometer. The attitude reference device of Fig. 2 is composed of a vertical gyro instrument 15, potentiometer 16 whose wiper arm 17 is coupled for rotation with the horizontal gimbal of gyro 15, voltage source 18 connected across potentiometer 16, and a reference signal modifying network connected between the potentiometer wiper arm 17 and a potentiometer tap point 19. This modifying network includes a resistance 20 and a parallel combination of capacitance 21 and resistance 22 in series therewith. The output voltage delivered to servo amplifier 3 from across resistance 20 includes the error signal voltage from potentiometer 16 and a derivative thereof which compensates for certain of the lags present in an autopilot system. This modifying network illustrates that certain components of the autopilot arrangement may be modified in accordance with known practices and yet remain within the scope of the present maneuvering invention.

Network 20, 21, 22 provides signals having a rate component in addition to the displacement component, and, as a result, the output of the maneuvering rate device includes a degenerative acceleration component as well as a rate component, if the motor control circuit is highly responsive. This aids in stabilizing the system and in resisting violent maneuvers of the aircraft.

The source of maneuvering reference signals comprises a potentiometer 23 connected across a voltage source 24, with potentiometer wiper arm 25 being rotated by motor 9 and the output being derived from between the wiper arm 25 and a tap point 27. The maneuvering reference signal from this apparatus is connected degeneratively in circuit with the attitude reference signal from resistance 20, and the difference between these two signals is applied to the servo amplifier 3 together with the signal from the follow-up circuit, the output of the maneuvering rate device which is shown in Fig. 2 as a generator 29, and the signal from the maneuvering control station. The difference between these two reference signals is also applied to the input of the motor control amplifier 10 which operates motor 9. Both the servo amplifier 3 and the motor control amplifier 10 may be of the types conventionally employed in servo systems whereby the outputs thereof may each drive a servo motor in either of two directions, depending upon the polarity or phase of the signals applied to the amplifier.

The maneuvering control station equipment for control of the elevator is represented by the potentiometer 30, a voltage source 31 connected thereacross, a miniature control stick 32, and a potentiometer wiper arm 33 mechanically coupled for actuation by the control stick 32. An output of control station signals of amplitude proportional to the magnitude of displacement of the control stick from the neutral position and having a polarity or phase dependent upon the direction of such displacement is secured between wiper arm 33 and a potentiometer tap point 34 which provides the neutral position.

It should be noted that the voltage sources of Fig. 2, Nos. 11, 18, 24 and 31 may be of unidirectional or alternating current. Additionally, while it has been convenient to represent the sources of the signals having the desired phase or polarity and amplitude characteristics as potentiometer devices, other devices, with which those skilled in the art are well acquainted, of an inductive nature, for example, may be substituted therefor, and selsyn-type devices are presently preferred in practice.

The generator 29 is illustrated in Fig. 2 as a conventional tachometer type generator having an output voltage proportional to the speed of motor 9. The maneuvering rate device has been thus shown in this figure primarily for the purpose of illustration and it should be recognized that the means for generating a control signal responsive to the rate and direction of the movements of motor 9, and potentiometer 23 may comprise other rate signal generating means and that the advantages of this invention will be maintained. One other suitable maneuvering rate signal generating means is a rate gyro, and this is discussed in more detail hereinafter.

The control system of Fig. 2 also includes means such as a switch 35 for disconnecting motor control amplifier 10 from motor 9. Another switch 36 is also provided in parallel with switch 35. Switch 36 is connected mechanically to miniature control stick 32 and closes when the stick is moved in either direction from its neutral position; the function of switch 36 is explained subsequently. While switches 35 and 36 are illustrated as opening and closing a connection between controller 10 and motor 9, in order to stop and start the latter, it will be readily understood that other conventional means may be used for stopping and starting motor 9 at the desired times.

It is the action of switch 35 which provides the maneuvering autopilot of this invention with automatic synchronizing. During conventional manual operation of the aircraft by the human pilot, switch 35 is closed. Therefore, since controller 10 is responsive to the difference between the attitude reference voltage from potentiometer 16 and the signal voltage from potentiometer 23, the controller energizes motor 9 when these two signals are unequal and causes the arm 25 to follow arm 17 on potentiometer 16 in the direction which tends to equalize the signal voltages of the two potentiometers. Thus, potentiometer 23 follows potentiometer 16, or more accurately the potential drop across resistor 20 which is derived from potentiometer 16, during non-automatic operation of the aircraft with the result that the autopilot is always ready for engagement without causing violent maneuvering. To engage the autopilot, it is necessary only to open switch 35. This stops motor 9 and fixes the position of potentiometer 23, thereby providing a maneuvering reference which the aircraft will then follow as long as the autopilot is engaged, until control stick 32 is moved. Regardless of what the aircraft may be doing when the autopilot is engaged, whether it be rolling, diving, or in straight level flight, the engagement will take place smoothly and the aircraft will continue in the same attitude until control stick 32 is operated.

After the autopilot has been engaged, the aircraft may be maneuvered, if desired, by moving control stick 32, in the appropriate direction. A movement of stick 32 in either direction closes switch 36 and again connects motor 9 to controller 10. When control stick 32 is moved, a voltage appears between arm 33 and terminal 34 on potentiometer 30 and this voltage is introduced into the signal system which supplies the servo amplifier. This causes an immediate movement of control surface 1 which, through the resulting motion of the aircraft, causes an error signal to be produced by potentiometer 16. This creates an unbalance between potentiometer 16 and potentiometer 23, which causes controller 10 to operate motor 9 in a direction to eliminate this unbalance. When motor 9 begins to turn, however, generator 29 is also rotated. Generator 29 is connected so that its output signal voltage opposes the control signal voltage from potentiometer 30. Therefore, motor 9 increases in speed until the voltage of generator 29 equals the voltage from potentiometer 30. Thereafter, motor 9 runs at a constant speed and introduces a rate signal into the servo amplifier signal system which counteracts the signal introduced by potentiometer 30, whereby the aircraft continues to maneuver at a substantially constant rate corresponding to the position of control stick 32.

To restore the aircraft to its original attitude, or to execute another maneuver, it is necessary only to move control stick 32 in the appropriate direction and to the desired extent. The direction of maneuvering corresponds to the direction of movement of control stick 32 from the neutral position while the rate of maneuvering depends upon the amount which the control stick is displaced from the neutral position. Thus, a maneuvering autopilot is provided which provides for maneuvering at a rate which is variable with the displacement of the control stick. Therefore, rapid maneuvers can be executed without disengaging the autopilot merely by a sufficient movement of the miniature control stick, or less rapid maneuvers can be performed by correspondingly smaller movements of the miniature control stick. It can be seen, therefore, that maneuvering with this autopilot system requires substantially the same motions by the pilot on a smaller scale as manual maneuvering without an autopilot.

It will be readily understood that a complete multiple-function maneuvering autopilot may include components in addition to or different from those which have been illustrated herein. As examples: the system may utilize either unidirectional current or alternating current; selsyns may be employed in place of potentiometers; the follow-up device may represent the control surface force instead of displacement; and means may be provided to compensate for lags in the autopilot system or to eliminate trim effects.

One modified embodiment of the invention in which a rate gyro mechanism is substituted for generator 29 as the maneuvering rate signal device is illustrated in Fig. 3 of the accompanying drawing. This figure is the same as the lower portion of Fig. 2 except for this substitution, and it should be understood that the remainder of the system is the same for Fig. 3 as for Fig. 2. In Fig. 3, the maneuvering rate signal device comprises a rate gyro instrument 37, a potentiometer 38 whose wiper arm 39 is coupled for rotation with the horizontal gimbal of gyro 37, and voltage source 40 connected across potentiometer 38. It will be readily understood by those skilled in the art that the position of gyro 37 and, hence, the output voltage of potentiometer 38 between arm 39 and mid tap 42 is proportional to the rate of change of attitude of the aircraft. This output voltage is connected in opposition to the signal voltage from potentiometer 30 in the maneuvering control station, in the same manner as the output voltage of generator 29 in Fig. 2. The operation of the autopilot is the same with the rate gyro mechanism as with generator 29, both providing a signal proportional to the rate of change of attitude of the aircraft. When the rate gyro mechanism is used as the maneuvering rate signal device, as in the Fig. 3, an additional switch 41 operated by miniature control stick 32 may be used to shunt potentiometer 38 during stabilized autopilot operation and to insert it in the main servo amplifier circuit whenever control stick 32 is operated in either direction.

If switch 41 is used as mentioned in the preceding paragraph, the operation of the system of Fig. 3 is the equivalent of the system shown in Fig. 2. However, switch 41 may be omitted, if desired, in which case rate gyro 37 acts as a stabilizing device during non-maneuvering autopilot operation, since the rate gyro is connected degeneratively in the main signal circuit to resist the rate of change of attitude and is independent of the maneuvering reference device. In this arrangement, the rate gyro has the same general effect as network 20, 21, 22 previously discussed.

It should be apparent that there are numerous changes which may be made in the above-described system by those skilled in the art without departing from the spirit and scope of this invention. Hence, it is intended that all material contained in this description or shown in the accompanying drawing shall be interpreted as illustrative and not in a limiting sense.

What I claim as new and desire to secure by Letters Patent of the United States is:

1. The combination in an aircraft automatic pilot of, a steering servomotor, means for measuring the actual turn rate of the craft including data transmitting means having two inputs and an output, motive means driven by the output of said data transmitting means, means driven by said motive means providing one of the inputs of the data transmitting means, an azimuth reference device providing the other input of the data transmitting means, second means driven by said motive means providing a signal proportional to the actual turn rate of the craft, and means interconnecting said second signal means and said steering servomotor.

2. The combination in an aircraft automatic pilot of, a steering servomotor, means for measuring the actual turn rate of the craft including data transmitting means having two inputs and an output, an electric motor energized by the output of said data transmitting means, means driven by said electric motor providing one of the inputs of the data transmitting means, an azimuth reference device providing the other input of the data transmitting means, a generator driven by said electric motor providing a signal proportional to the actual turn rate of the craft, and a circuit connecting said generating and steering servomotor.

3. In a system for positioning a movable surface of a craft to thereby control the condition of said craft, a servo system for actuating said control surface to establish the magnitude and sense of said condition of said craft responsively to the magnitude and sense of signals applied to said servo system, a reference device connected to said servo system for supplying a reference signal thereto, and selective means for varying the condition of said craft with respect to said reference device at a predetermined rate, said selective means comprising a variable signal device connected in circuit to energize said servo system and producing counteracting signals opposite in sense to said reference signals, an actuating device for operating said variable signal device, said actuating device being responsive to the difference in magnitude and sense of said reference signals and said counteracting signals, a control station connected in circuit to energize said servo system and producing control signals variable in magnitude and sense responsively to the extent and direction of movement of a control member from a predetermined position, and means connected degeneratively in circuit with said control station for deriving a signal responsive to the rate of change of condition of said craft.

4. In a system for controlling the condition of a craft of the type having a control surface, a servo system for actuating said control surface to establish the magnitude and sense of said condition of said craft responsively to the magnitude and sense of plural signals applied to said servo system, a reference device connected to said servo system for supplying a reference signal thereto, and selective means for varying the condition of said craft with respect to said reference device at a predetermined rate, said selective means comprising a variable signal device connected degeneratively in circuit with said reference device for producing counteracting signals opposite in sense to said reference signals, a reversible motor device for actuating said variable signal device, said motor device being responsive to the difference in magnitude and sense of said reference signals and said counteracting signals, a controller for said motor device connected in circuit with said reference device and said signal counteracting device, a control station connected in circuit to energize said servo system and producing control signals variable in magnitude and sense responsively to the extent and direction of movement of a control member from a predetermined position, and a reversible generator driven by said motor device and connected degeneratively in circuit with said control station for producing signals responsive to the rate of change of condition of said craft.

5. In a control system for a craft having a controllable condition partially determined by a control surface of said craft, a servo system for actuating said control surface to establish the condition of said craft responsively to signals applied to said servo system, an attitude reference device connected to said servo system for supplying a reference signal thereto, and selective means in circuit to energize said servo system for producing a predetermined rate of change of said condition of said craft with respect to said attitude reference device, said selective means comprising a variable signal device for producing signals counteracting said attitude reference signal, a control station energizing said servo system with control signals variable in magnitude and sense in response to the extent and direction of movement of a control member from a predetermined neutral position, and means connected degeneratively in circuit with said control station for deriving a signal responsive to the rate of change of said condition of said craft.

6. In a control system for positioning a movable member of a body to thereby control the condition of the body, a servo system for actuating said member in response to signals applied thereto, a reference signal generator energizing the servo with variable signals indicative of deviations of the body from a pre-established condition, a control station energizing said servo with variable signals in accordance with movement of a control member from a neutral position, a first feedback device energizing said servo with linear signals in opposition to the reference signal generator, a second feedback device energizing said servo with rate signals in opposition to said control station signals, and an actuating means responsive to differences between said reference signal and said first feedback device signals for operating said first and second feedback devices in accordance therewith, whereby the condition of said body is controlled at a rate of change dependent upon the displacement of said control member from said neutral position.

7. In a control system for positioning a movable member of a body to thereby control the condition of the body, a servo system for actuating said member in response to signals applied thereto, a reference signal generator energizing the servo with variable signals indicative of deviations of the body from a pre-established condition, a control station energizing said servo with variable signals in accordance with movement of a control member from a neutral position, a first feedback device energizing said servo with signals in opposition to the reference signal generator, a second feedback device energizing said servo with signals in opposition to said control station signals, and an actuating means responsive to differences between said reference signal and said first feedback device signals for operating said first and second feedback devices, the first feedback device generating a signal linearly proportional to its actuation, and said second feedback device generating a signal proportional to the rate of change of its actuation, whereby the condition of said body is controlled at a rate of change dependent upon the displacement of said control member from said neutral position.

8. In a maneuvering autopilot for an aircraft having a control surface, a servo system for actuating said surface in response to signals applied thereto, a reference signal generator energizing the servo with variable signals indicative of aircraft deviations from a pre-established attitude, a control station energizing said servo with command signals in response to the movement of a control member from a neutral position, a first feedback device energizing said servo with signals in opposition to said reference signals, an energizing means responsive to differences between said reference signals and feedback signals for actuating said first feedback device in accordance therewith, and a second feedback device energizing the servo with signals in opposition to said command signals in accordance with the rate of change of aircraft attitude, whereby said aircraft is maneuvered at a rate of change dependent upon the displacement of said control member from said neutral position.

9. In a maneuvering autopilot for an aircraft having a control surface, a servo system for actuating said surface in response to signals applied thereto, a reference signal generator energizing the servo with variable signals indicative of aircraft deviations from a pre-established attitude, a control station energizing said servo with command signals in response to the movement of a control member from a neutral position, a first feedback device energizing said servo with linear signals in opposition to said reference signals, a second feedback device energizing said servo with rate signals in opposition to said control station, and an energizing means responsive to differences between said reference signals and first feedback signals for actuating said first and second feedback devices, whereby said aircraft is maneuvered at a rate of change dependent upon the displacement of said control member from said neutral position.

10. In a maneuvering autopilot for an aircraft having a control surface, a servo system for actuating said surface in response to signals applied thereto, a reference signal generator energizing the servo with variable signals indicative of aircraft deviations from a pre-established attitude, a control station energizing said servo with command signals in response to the extent and direction of movement of a control member from a neutral position, a first feedback device energizing said servo with signals in opposition to said reference signals, a second feedback device energizing said servo with signals in opposition to said control station, and an energizing means responsive to differences between said reference signals and first feedback signals for actuating said first and second feedback devices, said first feedback device generating a signal linearly proportional to its actuation, and said second feedback device generating a signal proportional to a non-linear mathematical function of its actuation, whereby said aircraft is maneuvered at a speed related to the extent of displacement of said control member from said neutral position by said non-linear mathematical function.

11. In a maneuvering autopilot for an aircraft having a control surface, a servo system for actuating said surface in response to signals applied thereto, a reference signal generator energizing the servo with variable signals indicative of aircraft deviations from a pre-established attitude, a control station energizing said servo with command signals in response to the extent and direction of movement of a control member from a neutral position, a first feedback device energizing said servo with signals in opposition to said reference signals, an actuating means responsive to differences between said reference signals and feedback signals for actuating said first feedback device, a second feedback device energizing the servo with signals in opposition to said command signals responsive to the rate of change of aircraft attitude, and a means for normally disabling operation of said actuating means and enabling operation thereof upon the movement of said control member from said neutral position, whereby said aircraft is maneuvered at a rate of change dependent upon the extent of displacement of said control member from said neutral position.

12. In maneuvering autopilot for an aircraft having a control surface, a servo system for actuating said surface in response to signals applied thereto, a reference signal generator energizing the servo with variable signals indicative of aircraft deviation from a pre-established attitude, a control station energizing said servo with command signals in response to the extent and direction of movement of a control member from a neutral position, a feedback device energizing said servo with signals in opposition to said reference signals, an energizing means responsive to differences between said reference signals and feedback signals for actuating said first feedback device, and a rate gyro energizing said servo in opposition to said command signals with signals proportional to the rate of change of aircraft attitude devation, whereby said aircraft is maneuvered at a rate of change dependent upon the extent of displacement of said control member from said neutral position.

References Cited in the file of this patent

UNITED STATES PATENTS

| | | |
|---|---|---|
| 1,958,258 | Alexanderson | May 8, 1934 |
| 2,429,642 | Newton | Oct. 28, 1947 |
| 2,450,907 | Newton et al. | Oct. 12, 1948 |
| 2,464,629 | Young | Mar. 15, 1949 |
| 2,582,305 | Young | Jan. 15, 1952 |
| 2,586,034 | Halpert | Feb. 19, 1952 |
| 2,630,282 | Halpert | Mar. 3, 1953 |